M. E. ANDERSON.
FEED GRINDER.
APPLICATION FILED JULY 10, 1916. RENEWED MAY 3, 1918.
1,271,258.
Patented July 2, 1918.
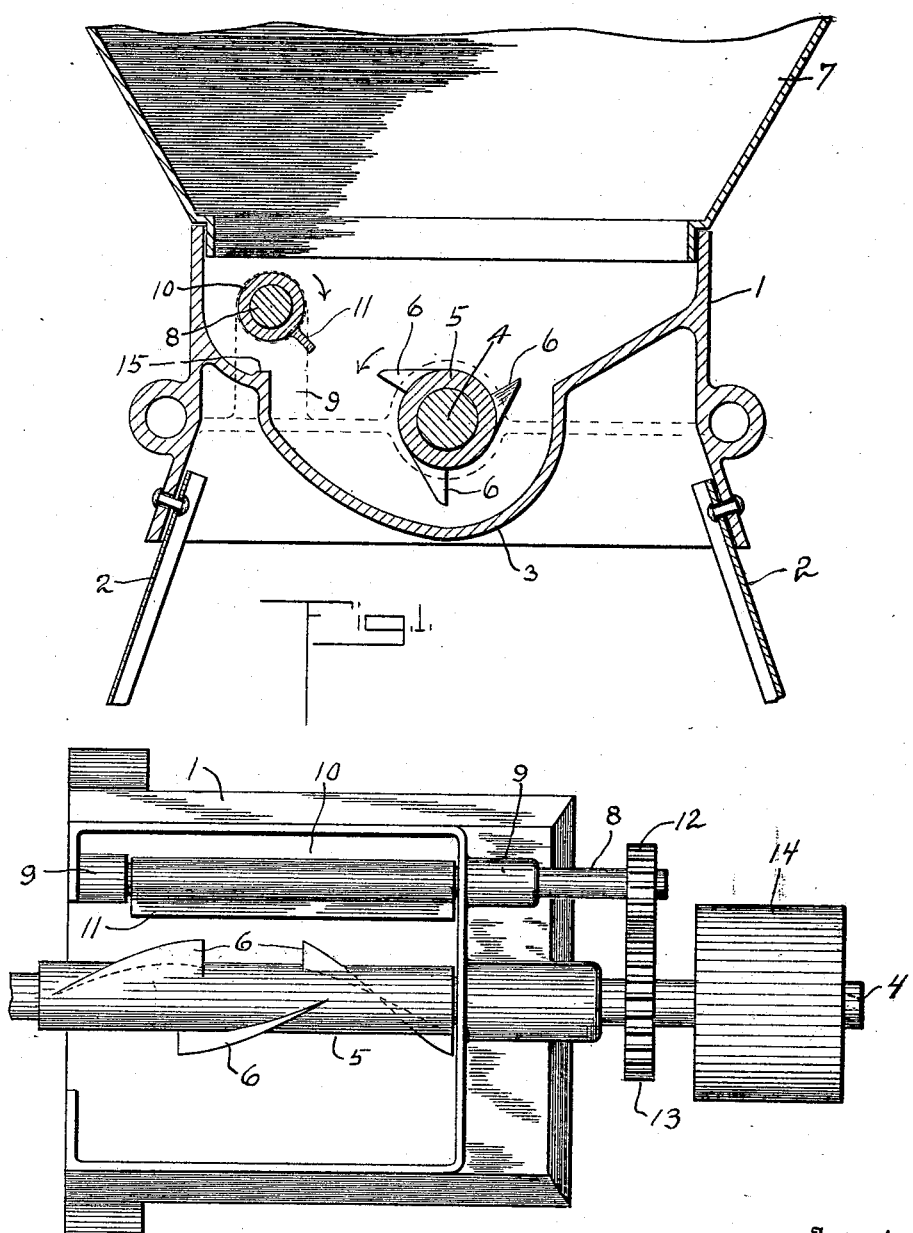

UNITED STATES PATENT OFFICE.

MARTIN E. ANDERSON, OF DE KALB, ILLINOIS, ASSIGNOR TO JACOB HAISH COMPANY, OF DE KALB, ILLINOIS.

FEED-GRINDER.

1,271,258.       Specification of Letters Patent.       Patented July 2, 1918.

Application filed July 10, 1916, Serial No. 108,288. Renewed May 3, 1918. Serial No. 232,379.

*To all whom it may concern:*

Be it known that I, MARTIN E. ANDERSON, a citizen of the United States, residing at De Kalb, in the county of Dekalb and State of Illinois, have invented certain new and useful Improvements in Feed-Grinders, of which the following is a specification.

My invention has reference to feed grinders, of that class which are employed for reducing corn and other grains to a pulverized condition. The present device relates more particularly to those parts of the machine which first operate upon the material and reduce it to a condition to be acted upon by the grinding burs. In machines of this kind the grain is first introduced into a hopper, beneath which is a concave containing rotary auger devices by which the ears of corn are torn and broken into small pieces. By the rapid rotary movement of the auger there is a tendency to carry the material round therewith and toss it about in such a way as to interfere with the perfect feed of the material, and my invention has special reference to means for preventing this condition and compelling a more perfect feed operation.

In the drawings: Figure 1 is a vertical cross-section through that part of a machine which embodies my invention. Fig. 2 is a plan view thereof, with the hopper removed.

1 represents a frame, mounted on legs 2, and provided with a concave 3. Rotatably mounted above the concave 3 is a shaft 4, upon which is fixed a sleeve 5, provided with spiral blades 6. A hopper 7 is supported on the frame 1, by means of which hopper the grain is introduced into the machine.

The movement of the auger 5 is in the direction indicated by the arrow in Fig. 1, and at that side of the machine toward which the auger moves a shaft 8 is journaled in bearings 9 on the frame 1. On the shaft 8 is fixed a sleeve 10, provided with a longitudinal plate 11 extending radially therefrom. The shaft 8 is actuated by means of a gear pinion 12 thereon in mesh with and driven by a gear wheel 13 on the shaft 4. Power is imparted to the shaft 4 by means of a pulley 14 fixed thereon, with which suitable belting can be connected, or by similar means.

The rotation of the shaft 8 is in a direction contrary to that of the shaft 4, and the relative speed of said shafts is such that the plate or fin 11 coöperates with each of the blades 6 as such blades reach a point adjacent to the sleeve 10. By this means any ears of corn which are being carried downwardly by one of such blades will be prevented from moving outwardly and upwardly, but will be forced downwardly into the concave. The space between the plate 11 and either of the blades 6, when in proximity, is such that an ear of corn of average size could not pass between them.

Just beneath the shaft 8 is a lip 15, of equal length with the plate 11, and which is in close proximity to said plate as it passes the same. This lip prevents the ears of corn from becoming wedged between the plate 11 and side wall of the concave. Any material which comes between such parts is cut thereby, the operation of the machine being thus aided.

The line of movement of the grain is downwardly from the hopper along the inclined floor at the opposite side to the shaft 8, till it reaches the auger 5, by which it is carried over the shaft 4 and downwardly into the concave. If the shaft 8 and plate 11 are omitted a considerable part of the material will become clogged at that side of the machine, forming a dead mass, and interfering with the perfect operation of the auger. By the use of the shaft 8 and appurtenant parts this condition is overcome.

What I claim as my invention, and desire to secure by Letters Patent of the United States, is:

A device of the class described, comprising a suitable receptacle provided with a concave; an auger rotatably mounted in said concave; an auxiliary shaft rotatably mounted in proximity to said auger and provided with a longitudinal plate adapted to coöperate therewith; and a lip in proximity to said plate at the lowest point of its movement.

In testimony whereof I affix my signature in the presence of two witnesses.

MARTIN E. ANDERSON.

Witnesses:
E. MULADORE,
A. C. HINDS.

Copies of this patent may be obtained for five cents each, by addressing the "Commissioner of Patents, Washington, D. C."